United States Patent [19]

Hashimoto et al.

[11] 4,294,527

[45] Oct. 13, 1981

[54] MOTOR DRIVEN CAMERA

[75] Inventors: Akihiko Hashimoto; Yukio Nakajima, both of Hachioji; Tamotsu Koiwai, Shimosuwa; Toyohiko Kimura, Hachioji, all of Japan

[73] Assignee: Olympus Optical Company, Ltd., Japan

[21] Appl. No.: 109,764

[22] Filed: Jan. 7, 1980

[30] Foreign Application Priority Data

Feb. 2, 1979 [JP] Japan .................................. 54-11260

[51] Int. Cl.³ ............................ G03B 1/12; G03B 3/00
[52] U.S. Cl. ........................................ 354/25; 354/31; 354/173
[58] Field of Search .................. 354/25, 31, 171, 173; 352/140; 355/56

[56] References Cited

U.S. PATENT DOCUMENTS 3,981,022  9/1976  Iwashita et al. .................... 354/171
3,999,197  12/1976  Iwashita et al. .................... 354/173

Primary Examiner—Michael L. Gellner
Attorney, Agent, or Firm—Ostrolenk, Faber, Gerb & Soffen

[57] ABSTRACT

A motor driven camera includes a reversible motor which is disposed within the body of a camera. The camera includes a transmission mechanism which transmits a drive from the motor to a film winding mechanism, a film rewind mechanism, a shutter charging assembly, an automatic focussing assembly or a zone focus assembly in a selective manner. The motor is disposed in a space in the camera body located below the film wind and rewind shafts. The drive shaft of the motor extends perpendicular to the optical axis of the camera lines.

14 Claims, 17 Drawing Figures

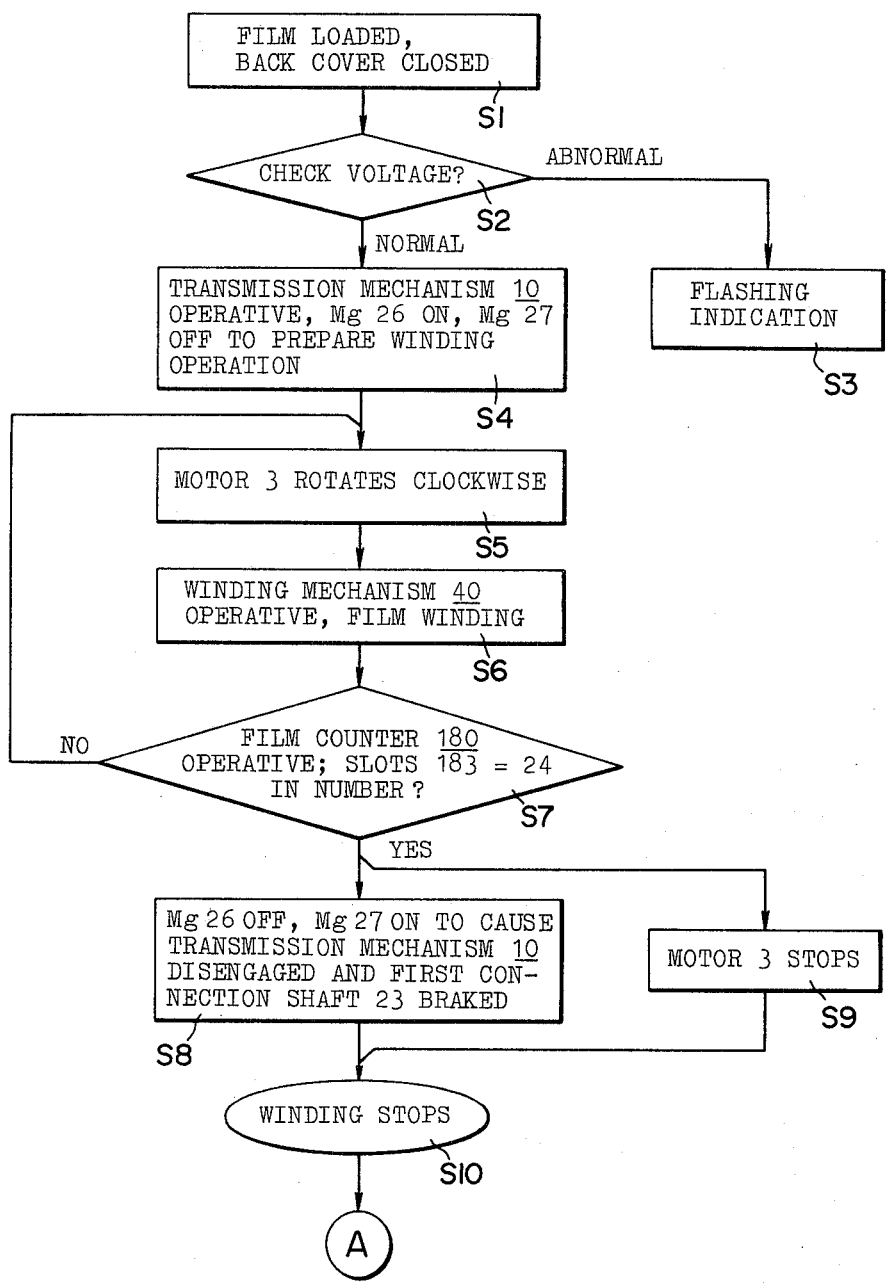

MOTOR DRIVEN CAMERA

BACKGROUND OF THE INVENTION

The invention relates to a motor driven camera, and more particularly, to a camera in which certain operations of the camera such as a film winding or rewind operation are automatically performed by utilizing a motor.

A motor driven camera requires increased space in its interior in order to dispose a motor therein. Because the motor has a larger size than that of other components, difficulty is experienced in the selection of the location therefor. One proposal has been to house the motor within the hollow space of a film winding shaft. However, while this facilitates the film winding operation, the drive transmission mechanism which is required to provide the film rewind operation becomes complex.

SUMMARY OF THE INVENTION

It is a first object of the invention to provide a motor driven camera which eliminates the described difficulty of the prior art and in which a motor is disposed within the body of the camera to permit a film winding and rewind operation with the simple arrangement, also enabling a miniaturization.

It is a second object of the invention to provide a motor driven camera of the type described in which the rotation of the single motor is transmitted through a drive transmission mechanism to a shutter charging assembly, an automatic focusing assembly and a zone focus assembly, thus enabling the latter functions to be automatically operated.

In accordance with the invention, a motor is disposed in a space within the body of a camera which is located below the film length extending across winding and rewind shafts and which has been heretofore considered as a dead space. The output shaft of the motor is disposed to extend in a direction substantially perpendicular to the optical axis of a lens. The drive from the motor is transmitted to a film winding and a film rewind mechanism through transmission gears, the meshing engagement of which is switched in accordance with the direction of rotation of the motor, thus simplifying the general arrangement and facilitating miniaturization of the camera.

Also, the motor driven camera of the invention permits the single motor to be utilized to drive not only the film winding and the film rewind mechanism, but also a shutter charging assembly, an automatic focusing assembly and a zone focus assembly to operate the latter functions automatically. In this matter, full automation of the camera is greatly facilitated.

DESCRIPTION OF PREFERRED EMBODIMENTS

Figure 1:
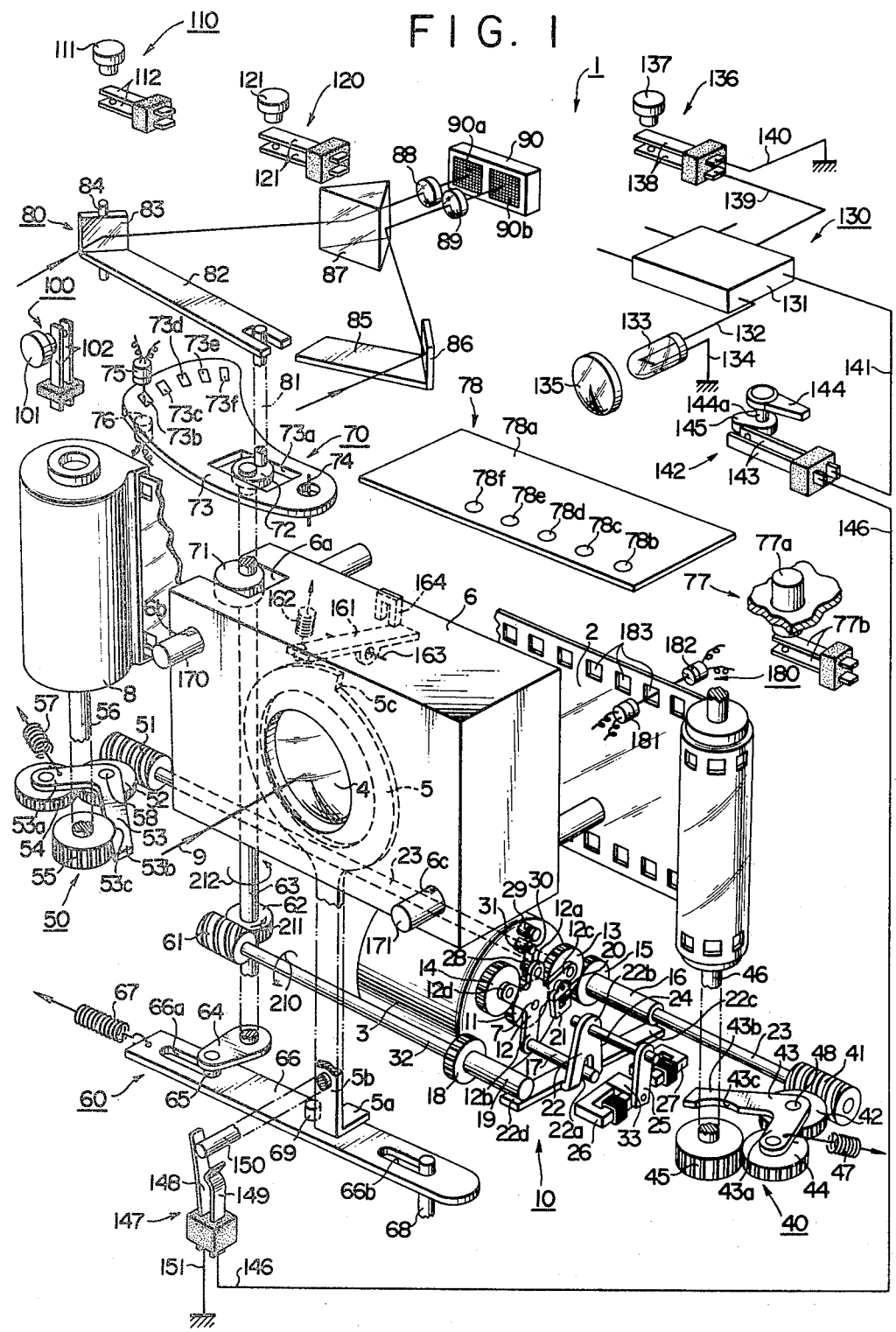
FIG. 1 is an exploded perspective view of a motor driven camera according to one embodiment of the invention.

Referring to FIG. 1, there is shown a motor driven camera 1 of the invention in an exploded perspective view, in which a single motor 3, located forwardly of and below a film portion 2 extending across the winding and rewind shafts of the camera, is utilized to operate various assemblies and mechanism of the camera in an automatic manner. The camera 1 shown includes the following mechanisms and assemblies:

1. Automatic film winding mechanism
2. Automatic film rewind mechanism
3. Automatic shutter charging assembly
4. Automatic focussing mechanism
5. An automatic zone focus assembly which may be utilized to establish a focal length of a taking lens automatically which corresponds to a distance chosen by a user by operating buttons or the like.
6. Distance memory assembly
7. Multiple exposure mechanism
8. Nighttime illumination assembly for automatic focussing purpose.

Referring to FIG. 1, the motor driven camera 1 includes a lens frame 6 which is disposed centrally within the body of the camera and which includes a taking lens 4, a shutter opening and closing ring 5, a shutter (not shown) and other members. A film 2 extends in taut condition at a position rearwardly of the lens frame 6. The motor driven camera 1 generally comprises the motor 3 disposed below the film 2; a drive transmission mechanism 10 which is connected with the output shaft 7 of the motor 3; a film winding mechanism 40 which is connected to the right-hand end of the transmission mechanism 10 through a first connection shaft 23; a film rewind mechanism 50 connected to the left-hand end of the transmission mechanism 10 through the same connection shaft 23; a shutter charging assembly 60 disposed forwardly of the motor 3 and connected thereto through a second connection shaft 32 which is contained in the transmission mechanism 10; a zone focus assembly 70 disposed on the upper, left-hand portion of the lens frame 6 and connected to a drive shaft 63 of the charging assembly 60; an automatic focusing assembly 80 disposed above the zone focus assembly 70 and connected to a cam 72 on the zone focus assembly 70 which drives a distance marker plate; a pushbutton switch 100 disposed on the left-hand of the zone focus assembly 70 and which is operated to memorize a distance being used; a multiple exposure pushbutton switch 110 disposed above the automatic focusing assembly 80; a shutter release pushbutton switch 120 located to the right of the switch 110; a nighttime illumination assembly 130 disposed to the right of the automatic focusing assembly 80 and used for automatic focusing purpose; and a film counter 180. The film rewind mechanism 50 includes a film rewind shaft 56 on which a film loaded cartridge (patrone) 8 is mounted, with the film 2 being pulled out of the cartridge 8 and extending to and wound on a film winding shaft 46 of the film winding mechanism 40.

The motor 3 is reversible, and its output shaft 7 extends in a direction perpendicular to the optical axis 9 of the lens 4.

The drive transmission mechanism 10 includes a sun gear 11 which is integrally mounted on the output shaft 7 of the motor 3 so as to be driven by the motor 3. A gear support member 12 is rotatably mounted on the free end of the output shaft 7, and includes a first arm 12a which extends upwardly, a second arm 12b which extends downwardly, a third arm 12c which extends rearwardly and slightly upward, and a fourth arm 12d which extends forwardly in symmetrical manner with respect to the third arm 12c. The free ends of the third and the fourth arm 12c, 12d rotatably carry a first and a second planet gear 13, 14, respectively, which mesh with the sun gear 11. The first planet gear 13 is in meshing engagement with a film winding and rewind drive gear 15 having a cylindrical mounting boss 16 which is fixedly mounted on the first connection shaft 23. The cylindrical boss serves braking the connection shaft 23, as will be further described later.

At a forward position which is symmetrical to the drive gear 15, a shutter charging drive gear 18 is fixedly mounted on the second connection shaft 32 for selective meshing engagement with the second planet gear 14. At a position which is symmetrical to the location of the cylindrical boss 16, another cylindrical body 19 having an increased diameter is fixedly mounted on the right-hand end of the connection shaft 32, to the right of the drive gear 18, to brake the shaft 32 as will be described later.

An armature 20 associated with an electromagnet 21 which is fixedly mounted on a stationary member (not shown) of the camera and which represents a rewind controlling, holding member is mounted on the third arm 12c of the gear support member 12 intermediate its length.

An actuating pin 17 is fixedly mounted on the free end of the second arm 12b of the gear support member 12, and has its free end extending into a slot 22a formed in a drive switching member 22. The switching member 22 includes a support 22b which extends upwardly and which fixedly carries a drive pin 24 on its free end. The slot 22a is formed in the lower end of the support 22b, and a lower portion of the support 22b is folded to the left at right angles, with the folded portion extending both forward and rearward to provide a first braking piece 22c which is adapted to engage and brake the peripheral surface of the cylindrical body 16 on the first connection shaft 23 as well as a second braking piece 22d which is adapted to engage and brake the peripheral surface of the cylindrical body 19 on the second connection shaft 32.

The drive pin 24 which is secured to the top end of the support 22b extends to the right in parallel relationship with the first and the second connection shaft 23, 32, with an armature holding member 25 integrally mounted on the free end thereof. A rewind controlling armature 33 is mounted on the lower end of the armature holding member 25. A film winding and rewind controlling electromagnet 26 which brakes the second connection shaft and a shutter charging controlling electromagnet 27 which serves braking the first connection shaft are disposed on the opposite sides of the armature 33. These electromagnets 26, 27 are mounted on stationary members of the camera, not shown.

A pin 28 is fixedly mounted on the free end of the first arm 12a of the gear support member 12, and a pair of pins 29, 30 are located above the pin 28 and mounted on a stationary member, not shown, of the camera. The pin 29 is located above the other pin 30, and carries a formed wire spring 31 thereon, the spring 31 being formed of a thin elastic wire material. The formed wire spring is a torsion spring which is constructed to have both its limbs 31a, 31b (see FIG. 2) urged toward each other. These limbs extend downward and resiliently hold the pins 30, 28 therebetween, thus maintaining the gear support member 12 at its neutral position.

The operation of the drive transmission mechanism 10 thus constructed will be described later in connection with FIG. 2. However, briefly, the activation of either electromagnet 26 or 27 causes the gear support member 12 to rotate either clockwise or counter-clockwise, thus transmitting the drive from the motor 3 to either the first connection shaft 23 or the second connection shaft 32. When the drive from the motor 3 is transmitted to the first connection shaft 23, a film winding or rewind operation may take place while when it is transmitted to the second connection shaft 32, a shutter charging operation, an automatic, focusing operation or a zone focus presetting operation may take place.

The film winding mechanism 40 comprises a film winding worm 41 which is fixedly mounted on the right-hand end of the first connection shaft 23 of the drive transmission mechanism 20 and which meshes with a sun gear 42. The sun gear 42 is mounted on a shaft 48, on which a connection lever 43 having an inverted L-configuration is rotatably mounted at its bend. The first arm 43a of the connection lever 43 which extends to the right rotatably carries a planet gear 44 on its free end which meshes with the sun gear 42. The planet gear 44 also meshes with a film winding gear 45 which is fixedly mounted on the lower end of the film winding shaft 46. The connection lever 43 also includes a second arm 43b which extends forward and to the left and which is formed with an arcuate brake 43c along its inner edge and adjacent to its free end. Intermediate its length, the first arm 43a is engaged by a coiled tension spring 47, which urges the connection lever 43 to rotate counter-clockwise about the shaft 48, whereby the brake 43c is brought into gentle abutment against the peripheral surface of the film winding gear 45 to apply a braking force thereto.

The film rewind mechanism 50 comprises a film rewind worm 51 which is fixedly mounted on the left-hand end of the first connection shaft 23 and which is formed with a gear defining groove therein which proceeds in the same direction as the worm 41 of the film winding mechanism 40. The worm 51 meshes with a sun gear 52, formed by a worm gear, which is mounted on a shaft 58, on which a connection lever 53 having an inverted L-configuration is rotatably mounted at its bend. The connection lever 53 includes a first arm 53a extending forward and to the left and rotatably carrying a planet gear 54 on its free end which meshes with the sun gear 52. The connection lever 53 also includes a second arm 53b extending forwardly and to the right and which is formed with an arcuate brake 53c along its inner edge and adjacent to its free end. Intermediate its length, the first arm 53a is engaged by a coiled tension spring 57, which urges the connection lever 53 to rotate clockwise about the shaft 58, whereupon the brake 53c is brought into abutment against the peripheral surface of a film rewind gear 55, fixedly mounted on the lower end of a film rewind shaft 56, thus applying a braking force thereto.

The shutter charging assembly 60 comprises a worm 61 which is fixedly mounted on the left-hand end of the second connection shaft 32 of the drive transmission mechanism 10 and which meshes with a drive gear 62 that is in turn fixedly mounted on a vertically extending drive shaft 63. Fixedly mounted on the lower end of the drive shaft 63 is one end of a shutter charging drive arm 64, which is adapted to rotate about the axis of the drive shaft 63 and which carries on the underside of its free end a shutter charging drive pin 65, which in turn extends through an elongate slot 66a formed in the left-hand end portion of a shutter charging member 66 in the form of a laterally elongate slidable plate. Another elongate slot 66b is formed in the right-hand end portion of the shutter charging member 66, and is engaged by a stationary pin 68 fixedly mounted on a stationary member, not shown, of the camera to serve as a guide pin. A pin 69 is fixedly mounted on the upper surface of the shutter charging member 66 intermediate its length, and extends to a position below the shutter ring 5, with its free end being folded back rearwardly to bear against the left-hand side face of an extension 5a from the shutter ring 5. When the shutter charging member 66 is driven to the right by the shutter charging pin 65, the pin 69 forces the extension 5a to the right, whereby the shutter ring 5 rotates counter-clockwise, thus charging the shutter. The upper end of the shutter ring 5 is formed with a detent step 5c which is adapted to be engaged by the front end of a lever 161 disposed above it. The detent lever 161 is normally urged to rotate clockwise (as seen from the right in FIG. 1) about its pivot 163, by means of a coiled tension spring 162 which has one end engaged with the front end of the lever 161, whereby the front end of the lever 161 is retracted out of the path of rotation of the detent step 5c. However, when a shutter controlling electromagnet 164 which is disposed adjacent to and spaced above the rear end of the lever 161 is energized, this rear end of the lever 161 is attracted by the electromagnet 164 to cause the detent lever 161 to turn counter-clockwise about the pivot 163. Thereupon, the front end of the detent lever 161 moves down against the force of the spring 160. Subsequently when the shutter ring 5 is charged, the step 5c is engaged by the front end of the lever 161, thus maintaining the shutter ring 5 in its charged condition. It will be noted that a coiled tension spring 67 has one end engaged with the left-hand end of the shutter charging member 66, thus urging it to the left.

The zone focus assembly 70 comprises a lens frame moving eccentric cam 71 which is fixedly mounted on an upper portion of the drive shaft 63 of the shutter charging assembly 60. The eccentric cam 71 is disposed in a rectangular recess 6a which is formed in the left-hand, upper portion of the lens frame 6, and has its peripheral surface maintained in tight engagement with the inner surface of the recess 6a. As the eccentric cam 71 is moved angularly about the axis of the drive shaft 63, the lens frame 6 moves forward and backward to adjust the focal length of the lens 4. The upper, left-hand portion and the lower right-hand portion of the lens frame 6 are formed with guide slots 6b, 6c, respectively, through which guide rods 170, 171 extend. In this manner, the entire lens frame 6 can be moved in the direction of the optical axis 9 of the lens 4 along these guide rods 170 171.

A distance marker plate driving, eccentric cam 72 is fixedly mounted on the upper end of the drive shaft 63, and is disposed within a rectangular slot 73a which is centrally formed in a fan-shaped distance marker plate 73 which is pivotally mounted on a pin 74. The peripheral surface of the eccentric cam 72 is maintained in tight engagement with the inner surface of the slot 73a. As the eccentric cam 72 is driven angularly about the axis of the drive shaft 63, the marker plate 73 is moved angularly about its pin 74. Five small rectangular slots 73b to 73f are formed along the fan-shaped edge of the distance marker plate 73 at the opposite end from the pin 74, and a light emitting element 75 and a photoelectric transducer element 76 are disposed above and below the marker plate 73 so as to be aligned vertically with one of the slots. The slots 73b to 73f are located so as to correspond to specified distances to objects as the distance marker plate 73 is driven angularly in accordance with the movement of the lens frame 6 which is driven by the eccentric cam 71. In other words, when the distance marker plate moves angularly as the lens frame 6 is moved, the first slot 73b is aligned with the elements 75, 76 for a focal length of the lens 4 of 2 m. Similarly, the second to fifth slots 73c to 73f aligned with the elements 75, 76, respectively, for focal lengths of 3 m, 5 m, 10 m and infinity, respectively.

Additionally, the zone focus assembly 70 includes a distance indicating pushbutton switch 77 and a distance indicator 78, both disposed on the top surface of the camera, for example. The purpose of the pushbutton switch 77 is to preset the camera to a given distance to an object being photographed. It includes a pushbutton 77a which projects above the top surface of the camera, and a pair of switch contacts 77b which are disposed below the pushbutton. The indicator 78 includes five light emitting elements 78b to 78f. The pushbutton switch 77 is connected with an electrical circuit, not shown, which may comprise a shift register or a control circuit to provide an output signal for energization of one of the elements 78b to 78f. A first operation of the pushbutton switch 77 illuminates only the first light emitting element 78b. A second operation causes the second element 78c to be illuminated alone while the first element 78b ceases to be illuminated. In a similar manner, a repeated operation of the pushbutton switch 77 causes the third to the fifth element 78d to 78f to be sequentially illuminated. It will be appreciated that these elements indicate a particular distance to an object being photographed which is chosen for the camera. The first element 78b corresponds to a distance of 2 m, the second element 78c to 3 m, the third element 78d to 5 m, the fourth element 78e to 10 m and the fifth element 78f to infinity. It will be understood that only one of the elements 78b to 78f is illuminated at any one time, and then the corresponding distance is effective in the camera.

It is to be noted that the indication of the distance by one of the elements 78b to 78f corresponds to the detection of the corresponding distance by one of the slots 73b to 73f formed in the distance marker plate 73. Specifically, an output signal from an electrical circuit which energizes a selected one of elements 78b to 78f of the indicator 78 and an output signal from the photoelectric transducer element 76 which reads the slots 73b to 73f of the distance marker plate are both introduced into a counter and comparator control circuit, not shown, the arrangement being such that an output signal from the transducer element 76 produced as the slots 73b to 73f move past between the elements 75, 76 during an angular movement of the distance marker plate 73 is counted by the control circuit, with the resulting count being compared against an output signal from the electrical circuit which energizes the elements 78b to 78f, to indicate a distance selected by the operation of the pushbutton switch 77, whereby the focal length of the lens 4 is adjusted to the selected distance. When an output signal from the transducer element 76 coincides with an output signal representing a distance which is displayed by one of the elements 78b to 78f, the angular movement of the distance marker plate 73 is interrupted at such point.

The elements 78b to 78f are disposed on a support plate 78a which has an increased surface area to permit the entry thereon of indicia of corresponding distances to an object being photographed or associated distance marks. This entry permits a user of the camera to easily recognize the distance to an object being photographed.

The automatic focusing mechanism 80 comprises a drive pin 81 fixedly mounted on the eccentric cam 72 toward its cam edge, and a movable mirror drive member 82 which has its free end maintained in fitting engagement with the upper end of the drive pin 81. The other end of the drive member 82 is pivotally mounted on a pin 84, and fixedly carries a movable mirror 83. At a position which is symmetrical to the movable mirror 83, a fixed mirror 86 is disposed on the right-hand side, and is fixedly mounted on the right-hand end of a fixed mirror support member 85. It will be understood that the movable mirror 83 moves angularly about the axis of the pin 84 as the free end of the drive member 82 is driven by the drive pin 81. This angular movement is also transmitted to the lens frame 6 through the eccentric cam 71. In this manner, when the lens 4 is focused on an object which is located at a short distance, the reflecting surface of the movable mirror 83 turns inwardly toward the reflecting surface of the fixed mirror 86. Conversely, for an object located at a greater distance, the mirror 83 turns outwardly.

A reflecting prism 87 is fixedly disposed intermediate the movable mirror 83 and the fixed mirror 86, but offset rearwardly. Light from an object being photographed which is reflected by the mirrors 83, 86 is reflected by the prism 87 to be passed through condenser lenses 88, 89, located rearwardly of the prism 87, for impingement on light acceptors 90a, 90b of a photometric unit 90 which is located further rearward thereof. The light acceptors 90a, 90b are formed by photoelectric transducer elements. The left-hand light acceptor 90a receives light from an object being photographed which is reflected by the movable mirror 83 while the right-hand acceptor 90b receives light which is reflected by the fixed mirror 86.

The automatic focusing assembly, comprising the photometric unit 90 having a pair of light acceptors 90a, 90b which receive light reflected by the movable mirror 83 and fixed mirror 86, represents a double image coincidence type which is well known in the art. Specifically, the movable mirror 83 may be turned until the output signals from the light acceptors 90a, 90b become substantially equal to each other. In other words, when the difference between the output signals from the light acceptors 90a, 90b is at its minimum, the lens 4 which is mechanically ganged with the movable mirror 83, is focused on an object being photographed.

The distance memory pushbutton switch 100 comprises a pushbutton 101 which is disposed on the front surface of the camera in order to facilitate its operation by a user, and a pair of switch contacts 102 disposed adjacent thereto. The purpose of the pushbutton switch 100 is to memorize a distance to an object being photographed which has been determined by the automatic focusing assembly 80 in order to permit a subsequent repeated photographing operation at such distance without requiring a determination of a distance to an object being photographed by the automatic focusing assembly 80 each time it is desired to take a picture. The distance can be determined and memorized by depressing the shutter release pushbutton switch 120 after the pushbutton switch 100 is initially depressed. It is to be noted that the depression of the pushbutton switch 120 in this instance does not cause a shutter release operation. Subsequently, each depression of the pushbutton switch 120 triggers a shutter release, thus permitting pictures to be taken repeatedly at the same distance. A subsequent depression of the pushbutton switch 100 resets the distance which has been memorized.

The multiple exposure pushbutton switch 110 comprises a pushbutton 111 and a pair of movable contacts 112. If the shutter release pushbutton switch 120 is depressed after the pushbutton switch 110 has been depressed, a film winding operation does not take place, but instead a multiple exposure is performed in that a repeated exposure takes place on a film which has been previously exposed once.

The nighttime illumination assembly 130 which is used for automatic focusing to illuminate an object being photographed during the nighttime comprises a power source 131, an illumination lamp 133 which is connected with the source 131 through a lead wire 132, a condenser lens 135 associated with the lamp 133, a manual illumination pushbutton switch 136 connected to the source 131 through a lead wire 139, a switch 142 which is mounted on an electronic flash assembly and connected to the source 131 through a lead wire 141, and another switch 147 connected to the switch 142 through a lead wire 146 for initiating the illumination in timed relationship with a charging operation. It will be noted that the other terminal of the lamp 133, the switch 136 and the switch 147 is connected with the ground through lead wires 134, 140, 151.

The pushbutton switch 136 for manual illumination comprises a pushbutton 137 which is disposed to project above the top surface of the camera, and a pair of switch contacts 138 which are disposed below the pushbutton. When a user depresses the pushbutton 137, the contacts 138 are closed to illuminate the lamp 133.

The switch 142 is closed when an electronic flash assembly is mounted on the camera, and comprises a detecting member 144 which is expelled as the flash assembly is mounted, an eccentric cam 145 which is integrally mounted on the lower end of a shank 144a of the detecting member 144, and a pair of switch contacts 143 which are driven into closure as they are urged by the cam 145. As the flash assembly is mounted on the camera, the member 144 is urged thereby to rotate the cam 145 to close the contacts 143.

The switch 147 is closed when a shutter charging operation is completed. The lamp 133 is illuminated through a series combination of this switch and the switch 142. The illumination switch 147 comprises a pair of switch contacts 148, 149, one of the contacts, 148, being greater in length with its upper end disposed for abutment by the free end of a pin 150 which is fixedly mounted on the arm 5b toward the lower end thereof, the arm 5b depending downwardly from the shutter ring 5. In this condition, the switch 147 remains open. However, when the shutter is charged, and the shutter ring 5 rotates counter-clockwise, the contact 148 is no longer biased by the pin 150, whereby the switch 147 is closed.

The shutter release pushbutton switch 120 serves the same purpose as a release switch which is usually provided on other cameras. In the motor driven camera of the invention, the pushbutton switch 120 starts the motor 1, whereupon all of the described functions, including a shutter charging operation, an automatic focusing operation, a shutter release operation, a film winding operation and a film rewind operation, can be triggered. The pushbutton switch 120 comprises a pushbutton 121 which is disposed to project above the top surface of camera, and a pair of switch contacts 121 disposed therebelow, and which are closed as the pushbutton 121 is depressed.

The film frame counter 180 is provided to count the number of perforation 183 formed along the edges of the film. It includes a photoelectric transducer element 181 and a light emitting element 182 which are disposed in alignment with each other on the opposite sides of one edge of the film where the perforations 183 are formed. As the film 2 is being wound by the film winding mechanism 40, the number of perforations in the film 2 is read by the combination of elements 181, 182 to determine if a film length corresponding to one frame has been wound or how many frames have been wound, thus controlling the film winding operation. Assuming that one frame of the film 2 corresponds to a length determined by eight perforations, one frame of the film can be wound by producing a control signal to interrupt the operation of the film winding mechanism 40 from the film frame counter 180 when it has counted eight perforations 183. When the film 2 is initially loaded into the camera, it is conventional that an initial film length corresponding to approximately three frames are wound without accompanying any operation on the part of the camera. At this end, the film frame counter 180 counts $8 \times 3 = 24$ perforations before interrupting the operation of the film winding mechanism 40. The counter 180 is also associated with the film rewind mechanism 50 to determine if the film 2 has been completely rewound.

Referring to FIGS. 1 to 6, the operation of the motor driven camera thus constructed will be described. As indicated by a sequence block S1 shown in FIG. 6a, a back cover (not shown) of the camera 1 is opened to load the film 2 therein, whereupon the cover is closed. Then a voltage check circuit, not shown, becomes operative to determine if the supply voltage of the camera 1 is normal or abnormal. If it is determined that the supply voltage is abnormal, indicating a low or unstable supply voltage, an indicator (not shown) of the camera 1 flashes to indicate the abnormality of the supply voltage, as shown by a sequence block S3.

When the supply voltage is normal, the motor drive transmission mechanism 10 becomes operative as indicated by a sequence block S4. In the transmission mechanism 10, the film winding and rewind controlling, electromagnet 26 (indicated by Mg26 in the sequence blocks of FIG. 6) is energized to attract the armature 33, as shown in FIG. 2d, whereby the free end of the armature holding member 25 turns to the left. The turning motion of the holding member 25 is transmitted to the switching member 22 which is connected therewith through the drive pin 24, thus turning the switching member 22 clockwise. Consequently, the second brake piece 22d of the switching member 22 is brought into abutment against the peripheral surface of the cylindrical body 19 on the second connection shaft 32. In this condition, the actuating pin 17 bears against the right-hand edge of the slot 22a formed in the switching member 22, thus preventing a counter-clockwise rotation of the gear support member 12 on which the actuating pin 17 is mounted, about the axis of the output shaft 7 of the motor 3.

When the motor drive transmission mechanism 10 is ready to initiate a film winding operation, the motor 3 starts to rotate clockwise as indicated by a sequence block S5 of FIG. 6a. Consequently, the sun gear 11 integrally mounted on the output shaft 7 of the motor 3 rotates clockwise as indicated by an arrow 190 in FIG. 2a. The first and the second planet gear 13, 14 rotate clockwise about the sun gear 11 as indicated by an arrow 193, while revolving counter-clockwise, as indicated by arrows 191, 192. Thus, the rotation of the planet gears 13, 14 causes the gear support member 12 to rotate clockwise, with result that the first planet gear 13 meshes with the film winding and rewind drive gear 15, driving it clockwise as indicated by an arrow 194.

Figure 2A:
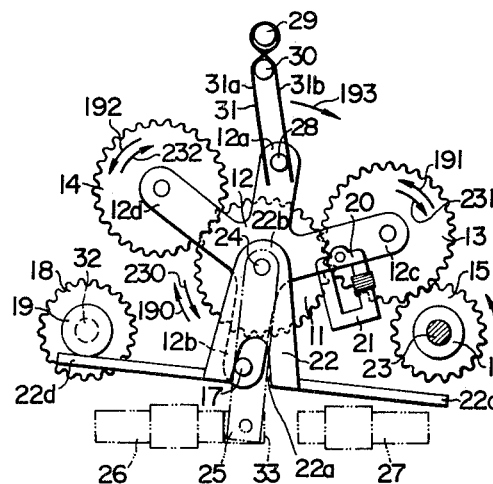
FIGS. 2a, b, c, and d are schematic side elevations illustrating different manners of operation of the drive transmission mechanism used in the motor driven camera of FIG. 1.
Figure 3A:
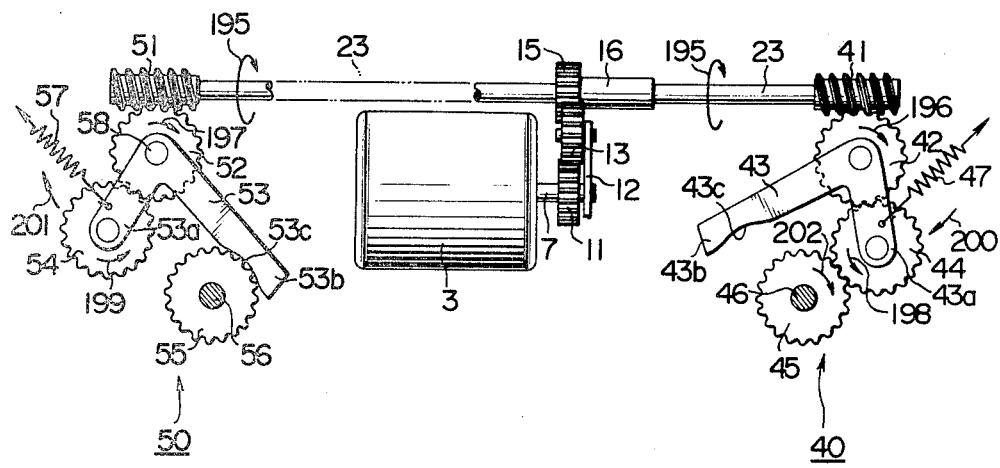
FIGS. 3a and b are plan views illustrating the transmission of a drive to the film winding and the film rewind mechanism in the motor driven camera of FIG. 1.
Figure 3B:
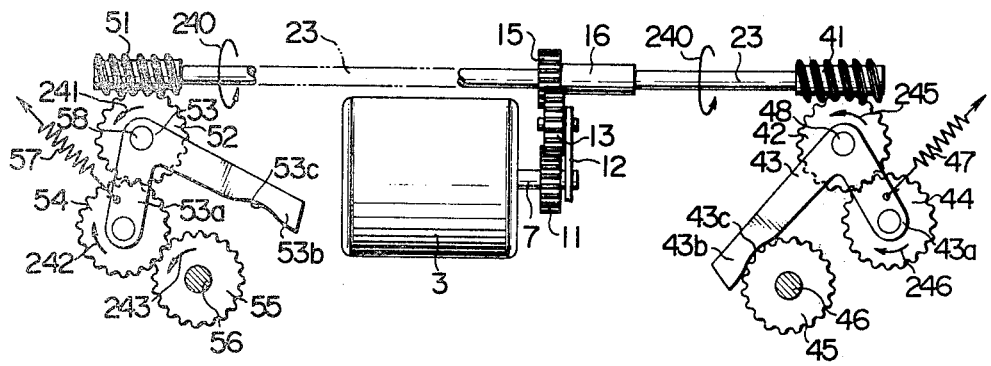

Thereupon, the first connection shaft 23 which is fixedly connected with the drive gear 15 rotates in the clockwise indication, as indicated by an arrow 194 in FIG. 2a and an arrow 195 in FIG. 3a. The clockwise rotation of the connection shaft 23 is transmitted to the film winding worm 41 in the film winding mechanism 40 and to the film rewind worm 51 in the film rewind mechanism 50, as shown in FIG. 3a, thus operating the film winding mechanism 40 to perform a film winding operation.

More specifically, when the first connection shaft 23 rotates clockwise as shown in FIG. 3a, the resulting rotation of the worms 41, 51 causes the sun gear 42 of the winding mechanism 40 and the sun gear 52 of the rewind mechanism 50 to rotate clockwise, as indicated by arrows 196, 197, respectively. Such rotation is transmitted to the planet gears 44, 54 which mesh with these sun gears 42, 52, causing these planet gears to revolve counter-clockwise as indicated by arrows 198, 199 while simultaneously causing them to rotate clockwise about the respective sun gears 42, 52. This results in a meshing engagement between the planet gear 44 of the film winding mechanism 40 with the film winding gear 45, which then rotates clockwise, as indicated by an arrow 202. On the other hand, the clockwise rotation of the planet gear 54 of the film rewind mechanism 50 causes the connection lever 53 to rotate clockwise about the pin 58, causing the brake 53c on the connection lever 53 to bear against the peripheral surface of the film rewind gear 55 to apply a braking effort thereto, thus preventing a film rewind operation.

The clockwise rotation of the film winding gear 45 causes the film winding shaft 46 to rotate clockwise, thus initiating a film winding operation. Consequently, the film frame counter 180 operates as indicated by a sequence block S7 shown in FIG. 6a, counting the number of perforations 183 formed in the film 2. When it has counted a number of perforations 183 which is equal to $8 \times 3 = 24$ corresponding to three frames, it produces an output signal which is fed to the motor 3 and the drive transmission mechanism 10, turning the film winding and rewind controlling electromagnet 26 off and the shutter charging controlling electromagnet 27 (indicated by Mg27 in FIG. 6a) on, as indicated by sequence blocks S8 and S9, to thereby stop the rotation of the motor 3, thus ceasing a film winding operation.

Figure 2B:
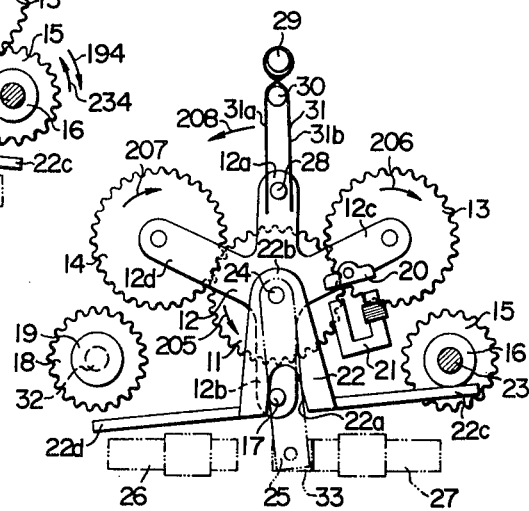

When the electromagnet 26 is turned off while the electromagnet 27 is turned on to deenergize the motor 3, the armature 33 of the transmission mechanism 10 is attracted to the electromagnet 27, as indicated in FIG. 2b, with result that the switching member 22 rotates counter-clockwise. The brake piece 22c bears against the peripheral surface of the cylindrical boss 16 to apply a braking effort to the first connection shaft 23, thus completely interrupting a winding operation by the film winding mechanism 40.

Figure 6B:
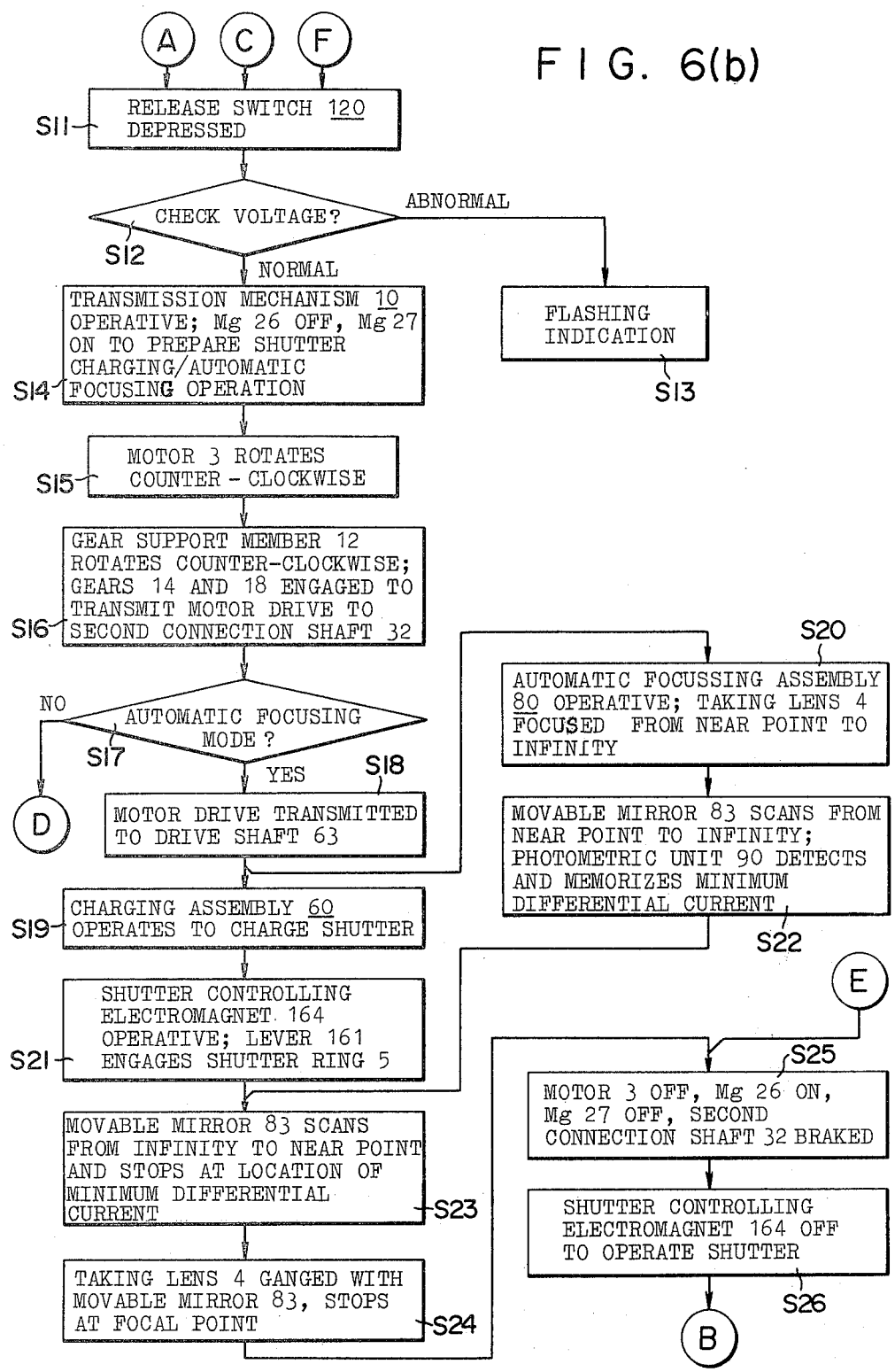
FIGS. 6a, b, c and d are flowcharts illustrating the operation of the motor driven camera of FIG. 1.

The above covers an operation of the camera 1 which takes place when the film 2 is loaded. Referring now to FIGS. 6b and c, a further operation of the camera will be described. It is to be noted that a sequence block S10 shown in FIG. 6a continues to a sequence block S11 shown in FIG. 6b, as indicated by a connector A.

Referring to FIG. 6b, the sequence block S11 indicates that as the shutter release pushbutton switch 120 is depressed, a voltage check circuit, not shown, checks the supply voltage of the camera 1 again. Any abnormality found causes an indicator (not shown) of the camera 1 to flash, as shown by a sequence S13, warning of an abnormality of the supply voltage.

When the supply voltage is normal, the drive transmission mechanism 10 becomes operative, as shown by a sequence block S14. In the transmission mechanism 10, the electromagnet 26 is initially turned off while the electromagnet 27 is turned on, as shown in FIG. 2b, so that the armature 33 is attracted by the electromagnet 27 to turn the armature holding member 25 counter-clockwise. The switching member 22 then turns counter-clockwise, with its first brake piece 22c brought into abutment against the peripheral surface of the cylindrical boss 16. The actuating pin 17 on the gear support member 12 bears against the left-hand edge of the slot 22a formed in the switching member 22, preventing a clockwise rotation of the gear support member 12 about the axis of the output shaft 7 of the motor 3.

When the transmission mechanism 10 is fully ready to initiate a shutter charging and an automatic focusing operation, the motor 3 rotates counter-clockwise, as indicated by a sequence block S15 shown in FIG. 6b. Then the sun gear 11 which is fixedly mounted on the output shaft 7 of the motor 3 rotates counter-clockwise as indicated by an arrow 205 in FIG. 2C, with result that the first and the second planet gear 13, 14 which mesh therewith rotate counter-clockwise, as indicated by an arrow 208, about the sun gear 11 while clockwise revolving as indicated by arrows 206, 207 in FIG. 2C, respectively. Consequently, the rotation of these planet gears 13, 14 causes the gear support member 12 to rotate counter-clockwise, as indicated by a sequence block S16. The second planet gear 14 meshes with the shutter charging drive gear 18, causing it to rotate counter-clockwise as indicated by an arrow 209.

Figure 2C:
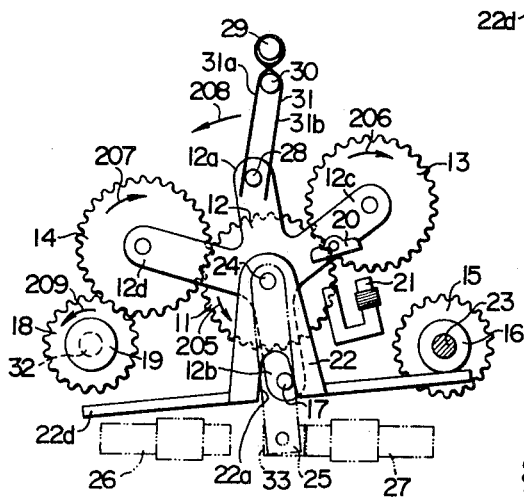
Figure 2D:
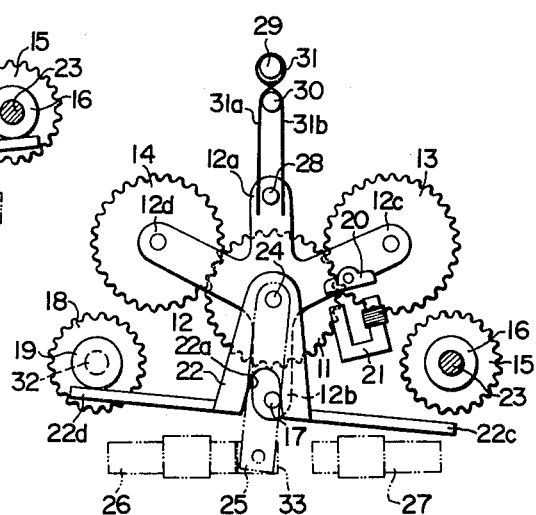

As a result, the motor drive is transmitted to the second connection shaft 32 on which the drive gear 18 is integrally mounted, and which rotates counter-clockwise as indicated by an arrow 209 in FIG. 2c or an arrow 210 in FIG. 1.

At this point, the camera 1 of the invention inquires about a preset mode of the camera, as indicated by a sequence block S17 of FIG. 6b. In this regard, it is to be understood that an automatic focusing mode or a zone focus mode may be preset in the camera of the invention. The sequence block S17 inquires whether it is an automatic focusing mode. If the automatic focusing mode is established, the operation of the camera continues to a sequence block S18.

In the sequence block S18, the counter-clockwise rotation of the second connection shaft is transmitted through the worn 61 to the drive gear 62, which therefore rotates in a direction indicated by an arrow 211. Its rotation causes the drive shaft 63 to rotate counter-clockwise as indicated by an arrow 212. The counter-clockwise rotation of the drive shaft 63 causes the shutter charging, drive arm 64 to rotate in the same direction, whereby the shutter charging assembly 60 is operated to charge a shutter (see a sequence block S19).

Figure 4A:
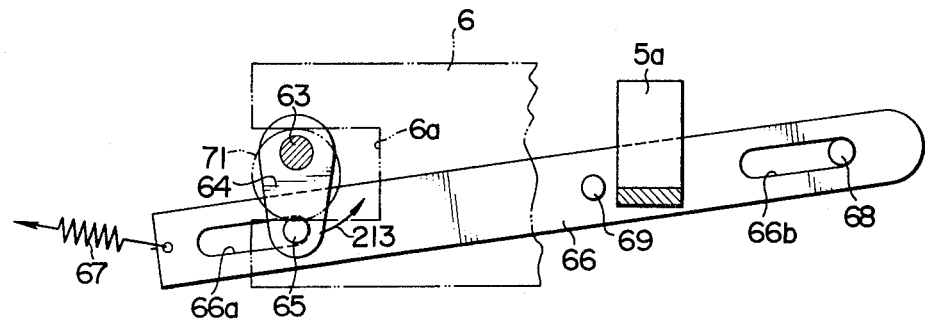
FIGS. 4a, b, c and d are plan views illustrating different phases of operation of a shutter charging assembly used in the motor driven camera of FIG. 1.
Figure 4B:
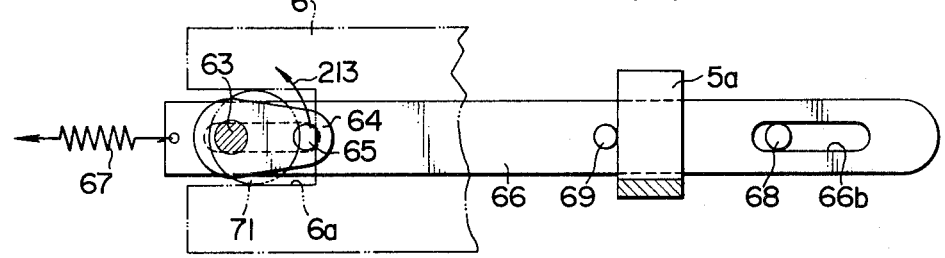

Thus, referring to FIG. 4a, when the drive arm 64 rotates counter-clockwise as indicated by an arrow 213, the charging pin 65 provided thereon expels the shutter charging member 66 to the right against the resilience of the spring 47 until a position shown in FIG. 4b is reached, whereupon the pin 69, fixedly mounted on the shutter charging member 66 intermediate its length, expels the driven arm 5a of the shutter ring 5, which therefore rotates counter-clockwise about the taking lens 4. When the detent step 5c formed in the shutter ring 5 moves to a position below the detent lever 161, the shutter controlling electromagnet 164 is energized, as shown by a sequence block S21 of FIG. 6b, to attract the rear end of the detent lever 161 to cause the front end thereof to engage the step 5c to maintain the shutter in its charged condition.

On the other hand, the rotation of the drive shaft 63 is transmitted to the distance marker plate driving, eccentric cam 72 and the lens frame driving, eccentric cam 71, both of which operate to activate the automatic focussing assembly 80, as indicated by a sequence block S20.

Specifically, the eccentric cam 71 rotates counter-clockwise about the axis of the drive shaft 63, as shown in FIGS. 4a and b, so that its peripheral surface drives the inner surface of the recess 6a formed in the lens frame 6, which is therefore driven in a fore and aft direction, thus adjusting the focal length of the taking lens 4. Since the eccentric cam 71 and the drive arm 64 are fixedly mounted on the same drive shaft 63, they rotate in the same manner.

Figure 4C:
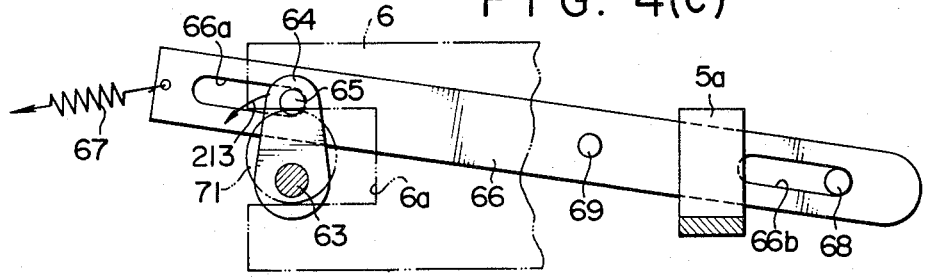

Considering the adjustment of the focal length more closely, a portion of the peripheral surface of the eccentric cam 71 which is located furthest from the drive shaft 63 lies in the common plane with the drive pin 65 on the shutter charging drive arm 64, so that in the initial position shown in FIG. 4a, it is located at its forward position where it is parallel to the optical axis of the lens. Therefore, the lens frame 6 assumes its foremost position. Consequently, the taking lens 4 mounted therein is focussed on a nearest point. When an intermediate position shown in FIG. 4b is reached as the cam 71 rotates, the furthest point on the eccentric cam 71 and the drive pin 65 will be located on a line which is perpendicular to the optical axis of the lens, so that the lens frame 6 moves to an intermediate position which is retracted from the position shown in FIG. 4a, with a corresponding focal length of the taking lens 4. When a position shown in FIG. 4c is reached through a further rotation of the cam 71, the furthest point on the eccentric cam 71 and the drive pin 65 assumes a rearmost position as does the lens frame 6. The taking lens 4 is then focussed on a point at infinity.

In this manner, the lens frame 6 moves from its forward to its rear position as the eccentric cam 71 rotates through the positions shown in FIGS. 4a to 4c. Accordingly, the distance between the taking lens 4 mounted in the lens frame 6 and the film surface which is disposed rearwardly thereof varies between a maximum and a minimum distance, automatically adjusting the focal length of the taking lens 4.

Figure 4D:
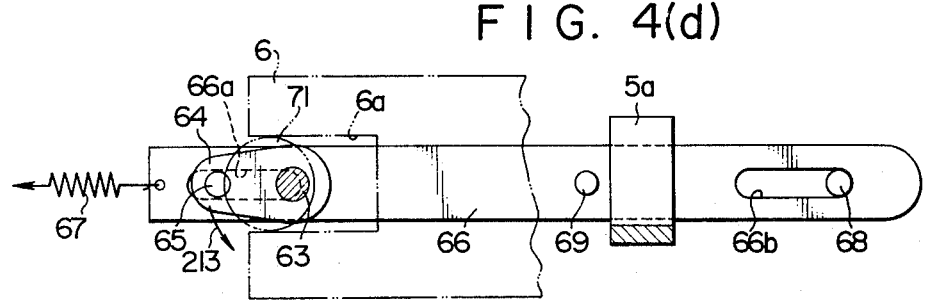

FIG. 4d shows a position of the eccentric cam 71 which has moved past the position shown in FIG. 4c and further rotated counter-clockwise to a point where the lens frame 6 assumes the same intermediate position as that shown in FIG. 4b.

As the focal length of the taking lens 4 varies from the minimum value (FIG. 4a) to infinity (FIG. 4c), the movable mirror 83 of the automatic focusing assembly 80 scans objects located from the nearest point to infinity, and the photometric unit 90 detects a minimum value of the differential current, which is then memorized.

More specifically, as the drive shaft 63 rotates, the drive pin 81 fixedly mounted on the upper surface of the distance marker plate driving, eccentric cam 72 causes the movable mirror 83 to move angularly about the pin 84. In the position shown in FIG. 1, the drive pin 81 is located rearmost where the movable mirror 83 forms an angle of reflection with respect to the optical axis 9 which represents a smallest acute angle, receiving light from an object being photographed which is located nearest. This condition agrees with the position of the taking lens 4 which has its minimum focal length.

When the drive shaft 63 rotates in the direction of the arrow 212 from the condition shown in FIG. 1, where the movable mirror 83 receives light from an object located nearmost and the taking lens 4 is focused to such object, the movable mirror 83 begins to form a greater angle than that shown in FIG. 1 until it is located to receive light from an object located at infinity. On the other hand, the taking lens 4 moves so as to be focused on an object located at infinity in mechanical association with the movement of the movable mirror 84.

As mentioned above, the movable mirror 83 reflects light from an object being photographed while scanning those objects located between the nearest point and infinity. The reflected light is directed to the prism 87 and passed through the condenser lens 88 to impinge on the light acceptor 90a of the photometric unit 90 where it is converted into an electrical signal or photocurrent. On the other hand, the same light is reflected by the fixed mirror 86, directed to the prism 87 and passed through the condenser lens 89 to impinge on the light acceptor 90b of the photometric unit 90 where it is converted into an electrical signal or photocurrent. The both photocurrents are compared against each other. If the photocurrent which results from the reflection by the movable mirror 83 is substantially equal to the photocurrent which results from the reflection by the fixed mirror 86, or when the difference therebetween is at its minimum, the photometric unit 90 detects the minimum differential current and memorizes it. This operation takes place continuously as the focal length of the taking lens 4 is changed from the nearest distance to infinity or during the movement of the pin 65 and the lens frame 6 from their position shown in FIG. 4a to their position shown in FIG. 4c.

Figure 5:
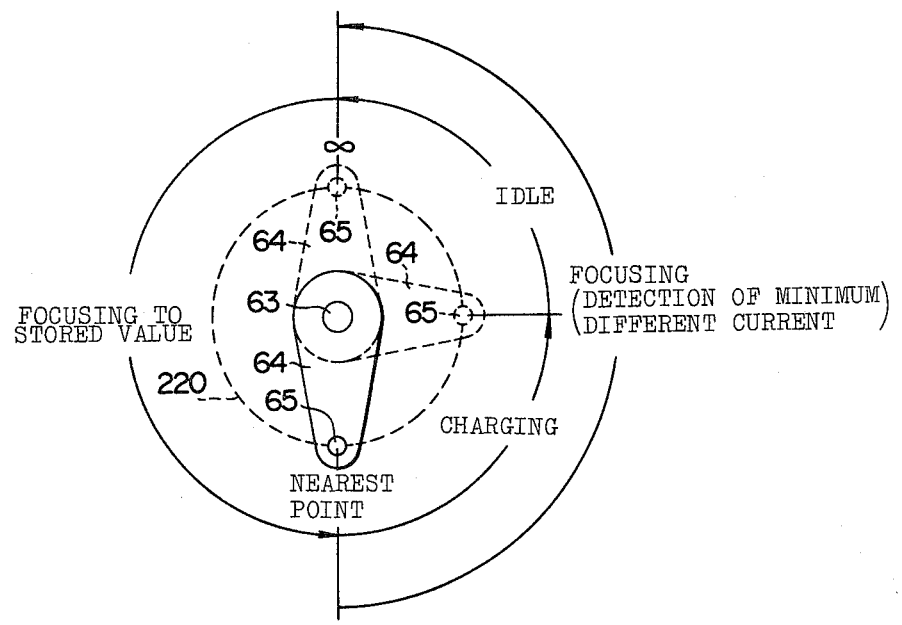
FIG. 5 is a schematic plan view of a shutter charging drive member which is used in the shutter charging assembly of the motor driven camera of FIG. 1, illustrating the shutter charging and the focusing operation as a function of the rotational position of a drive pin of the charging assembly.

Referring to FIG. 5, the above relationship will be more specifically considered. in FIG. 5, the shutter charging drive arm 64 is adapted to rotate about the axis of the drive shaft 63, and the drive pin 65 provided thereon depicts a circle 220 centered on the axis of the drive shaft 63 while rotating counter-clockwise. When the drive pin 65 is located at its vertically down position, which corresponds to its position shown in FIG. 4a, the taking lens 4 has a focal length which corresponds to the nearest point. During the time the drive pin 65 moves from this down position to its right-hand position, the shutter is charged in the manner mentioned above. Subsequently, it moves from this right-hand position to its upper position. However, in the automatic focussing assembly 80, during the movement from the lower position to the upper position, the movable mirror 83 scans light from objects which are located from the nearest point to infinity, thus detecting the minimum value of the differential photocurrent to locate the focal length of the taking lens 4. It is to be understood that the movement of the drive pin 65 from the lower to the upper position, or the scanning of objects located from the nearest point to infinity by the movable mirror 83, takes place continuously, while electrically memorizing any minimum differential current which is detected.

After the minimum differential current is detected and memorized, the drive shaft 63 returns the movable mirror 83 in the opposite direction, which scans objects located from infinity to the nearest point, as indicated by a sequence block S23. The value of the photocurrent which results from the scanning during the returning movement is compared against the minimum differential current which is memorized until a coincidence is reached, where the motor 3 is stopped as is the movable mirror 83. Obviously, as the movable mirror 83 scans from infinity to the nearest point, the focal length of the taking lens 4 is adjusted by a movement thereof which is interlocked with movement of the movable mirror 83. Hence, when the movable mirror 83 has detected the minimum differential current to stop the motor 3, the taking lens 4 comes to a stop at a position where it is focussed onto the corresponding object. See a sequence block S24. As indicated in FIG. 5, this focusing operation takes place while the drive pin 65 moves from its upper to its lower position, and when the desired focal length is detected, the drive pin 65 ceases to move.

When the motor 3 is stopped by the detection of the minimum differential current by the movable mirror 83, and the taking lens 4 of the camera is located at a position corresponding to the required focal length, the output signal of the photometric unit 90 turns the electromagnet 26 of the motor drive transmission mechanism 10 on while turning the electromagnet 27 off. Consequently, the second brake piece 22d is brought into abutment against the peripheral surface of the cylindrical body 19 on the second connection shaft 32 to apply a braking effort thereto, as shown in FIG. 2d, thus completely interrupting the operation of the automatic focussing assembly 80. (See a sequence block S25 of FIG. 6b.).

When the focal length of the lens 4 is determined in this manner and the automatic focussing assembly 80, the motor 3 and the transmission mechanism 10 cease to operate, the shutter controlling electromagnet 164 is turned off as indicated by a sequence block S26, thus disengaging the detent lever 161 from the shutter ring 5 to permit the shutter ring 5 to rotate clockwise to effect a shutter operation for purpose of a photographing operation.

Figure 6C:
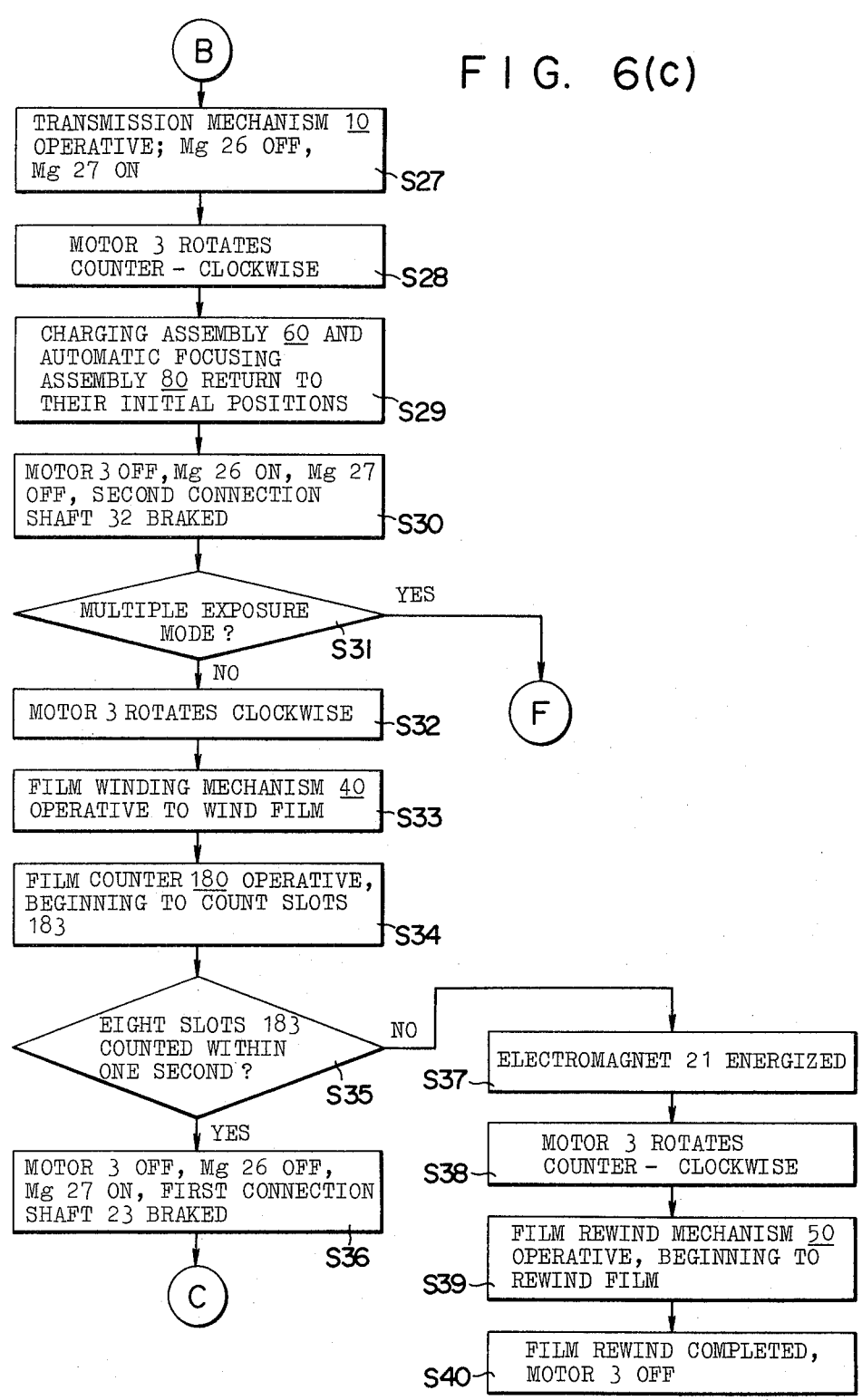

After the shutter operation has taken place, the motor drive transmission mechanism 10 becomes operative as indicated by a sequence block S27 of FIG. 6c. Specifically, the electromagnet 26 is turned off while the electromagnet 27 is turned on, as shown in FIG. 2b. The motor 3 then rotates counter-clockwise, as indicated by a sequence block S28. As a result, the second planet 14 of the transmission mechanism 10 meshes with the shutter charging, drive gear 18 to transmit the drive from the motor 3 to the second connection shaft 32 as shown in FIG. 2c. The rotation of the second connection shaft 32 is transmitted to the drive shaft 63, whereby the charging assembly 60 and the automatic focusing assembly 80 are returned to their initial positions.

Subsequently, the motor 3 is turned off and the electromagnet 26 of the transmission mechanism 10 is turned on while the electromagnet 27 is turned off, as indicated by a sequence block S30. This corresponds to the abutment of the second braking piece 22d against the cylindrical body 19 on the second connection shaft 32, applying a braking effort thereto, as shown in FIG. 2d.

The operation which takes place next represents a film winding operation. However, before that, an inquiry is made if a multiple exposure mode is established, as indicated by a sequence block S31 of FIG. 6c. The multiple exposure function can be established by previously depressing the pushbutton switch 110 shown in FIG. 1. When the pushbutton switch 110 is depressed, no film winding operation takes place at this time and the sequence block S31 is followed by the sequence block S11 of FIG. 6b, as indicated by a connector F. However, if the pushbutton switch 110 is not depressed, the motor 3 rotates clockwise, as indicated by a sequence block S32. Consequently, in the motor drive transmission mechanism 10, the gear support member 12 rotates clockwise about the output shaft 7 as mentioned previously to cause the first planet gear 13 to mesh with the film winding and rewind, drive gear 15 to drive the film winding mechanism 40, as indicated in FIG. 2a. As mentioned previously in connection with FIG. 3a, the connection shaft 23 rotates clockwise as indicated by the arrow 195, and the resulting rotation is transmitted to the film winding gear 45 through the sun gear 42 and the planet gear 44. The rotation of the gear 45 causes the film winding shaft 46 to rotate, thus winding up the film 2. When a film winding operation is initiated, the film frame counter 180 becomes operative, as indicated by a sequence block S34, beginning to count the number of perforations 183 in the film. If eight perforations 183 have been counted within a period which does ot exceed one second, it is determined that the film winding operation has been performed in a normal manner, as indicated by a sequence block S35. The motor 3 is then turned off as indicated by a sequence block S36, turning the electromagnet 26 off and the electromagnet 27 of the transmission mechanism 10 on, thus applying a braking effort to the first connection shaft 23. The subsequent operation continues to the sequence block S11 of FIG. 6b, as indicated by a connector C shown in FIG. 6c.

In the event the film counter 180 fails to count eight perforations 183 within one second, this represents that there is no available film frame. Consequently, the electromagnet 21 in the transmission mechanism 10 is energized, as indicated by a sequence block S37 of FIG. 6c.

The purpose of the electromagnet 21 is to enable a film rewind operation. When the electromagnet 21 is energized, the armature 20 which is mounted on the third arm 12c, intermediate its length, of the gear support member 12 is attracted to the electromagnet, as shown in FIG. 2a. Consequently, when the motor 3 rotates counter-clockwise, the planetary gearing does not operate, and the meshing engagement of the first planet gear 13 with the film winding and rewind, drive gear 15 is not released.

When the transmission mechanism assumes the position shown in FIG. 2a, the motor 3 rotates counter-clockwise, as indicated by a sequence block S38. Because the electromagnet 21 holds the armature 3 attracted thereto, the counter-clockwise rotation of the motor 3 cannot reset the transmission mechanism 10. As the motor 3 rotates counter-clockwise, the sun gear 11 mounted on the output shaft 7 thereof rotates counter-clockwise in FIG. 2a, as shown by an arrow 230. Hence, the first planet gear 13 and the second planet gear 14 rotate clockwise, as indicated by arrows 231, 232, respectively. The drive gear 15 which meshes with the second planet gear 13 rotates counter-clockwise, as indicated by an arrow 234. Consequently, the first connection shaft 23 which is integral with the drive gear 15 rotates counter-clockwise, as indicated by an arrow 240 in FIG. 3b, whereby its rotation is transmitted to the film rewind mechanism 50 through the worm 51 which is mounted on the left-hand end of the first connection shaft 23. Thereupon the sun gear 52 of the film rewind mechanism 50 rotates counter-clockwise, as indicated by an arrow 241, as the worm 51 rotates, and the planet gear 54 rotates clockwise as indicated by an arrow 242. This results in a counter-clockwise rotation of the film rewind gear 55, as indicated by an arrow 243. This rotation of the gear 55 causes the film rewind shaft 56 to rotate counter-clockwise, thus performing a film rewind operation. When the rewind operation for the film 2 is completed, the motor 3 is stopped, as indicated by a sequence block S40.

The described film rewind operation takes place after taking a picture by utilizing the automatic focusing function.

The zone focus mode will now be described. In this instance, the pushbutton switch 77 of the zone focus assembly 70 is initially depressed. Because the zone focus assembly 70 is preset by depressing the pushbutton switch 77 to provide an indication by means of the light emitting elements 77b to 77f of the zone focus indicator 78, a single depression of the pushbutton switch illuminates the first light emitting element 78b corresponding to a specified distance of 2m. When the pushbutton switch 77 is depressed another time, the indication of the indicator 78 shifts from the element 78b to the second element 78c corresponding to a distance of 3m. In a similar manner, the third element 78d corresponds to 5m, the fourth element 78e to 10m and the fifth element 78f to infinity. By a visual inspection of the distance to an object being photographed, the user of the camera operates the pushbutton switch 77 a number of time which corresponds to the desired distance. Subsequently the shutter release pushbutton switch 120 of the camera 1 may be depressed to enable the taking lens to be adjusted to a focal length corresponding to the selected distance.

Considering this operation more specifically, the shutter release pushbutton switch 120 is depressed as indicated by the sequence block S11 of FIG. 6b, followed by subsequent operations up to that indicated by the sequence block S17. Since these operations have been mentioned previously, they will not be repeatedly described. An inquiry whether the automatic focusing mode is established is made at the sequence block S17. In the zone focus mode, the answer should be "No". Hence, the next operation jumps to a sequence block S41 of FIG. 6d, as indicated by a connector D in FIG. 6b.

Figure 6D:
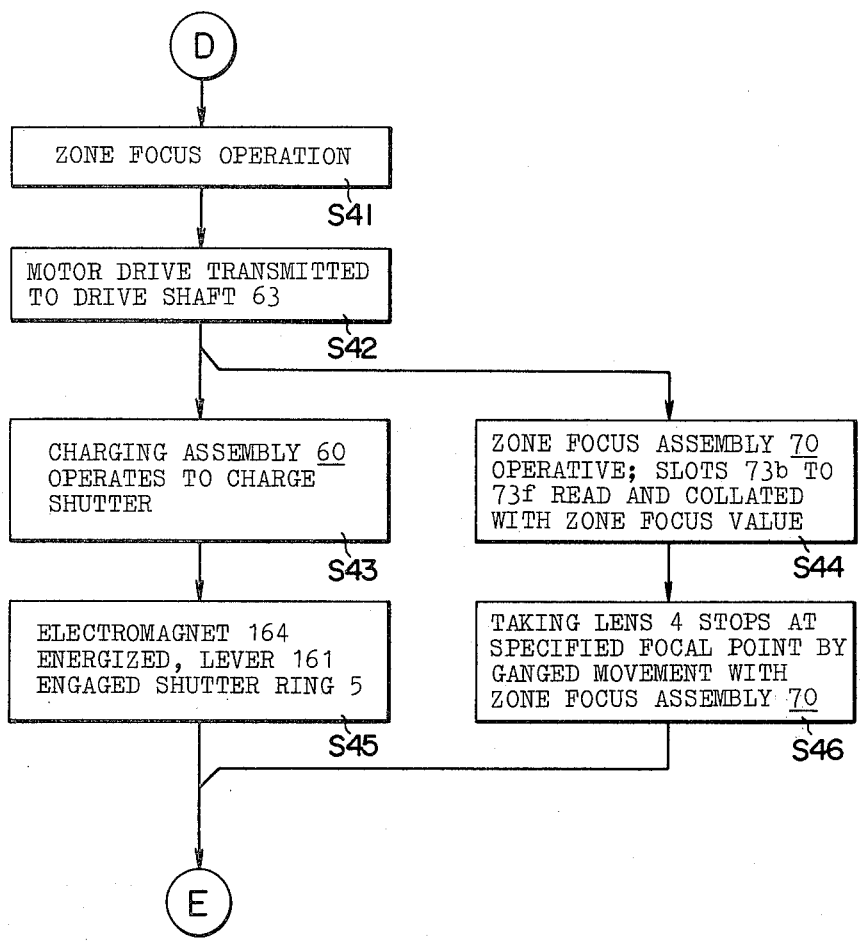

Referring to the sequence block S41 of FIG. 6d, it should be noted that whenever the zone focus mode is established, the drive from the motor 3 is transmitted to the drive shaft 63 through the transmission mechanism 10 (see a sequence block S42). The sequence block S42 is followed by sequence blocks S43 and S45 where the shutter charging operation and the engagement of the detent lever 161 with the shutter ring 5 take place. Because these operations have been described previously in connection with the sequence blocks S19 and S21 of FIG. 6b, they will not be described. Then, the sequence block S42 is followed by a sequence block S44 where the zone focus assembly 70 is activated. This operation utilizes the distance marker plate driving, eccentric cam 72 and the lens frame driving, eccentric cam 71, both of which are mounted on the drive shaft 63. When the eccentric cam 72 is driven by the drive shaft 63 to rotate counter-clockwise as indicated by an arrow 212, the distance marker plate 73 rotates counter-clockwise about the pin 74, whereby the slots 73b to 73f which are formed adjacent to the free end of the plate 73 pass between the light emitting element 75 and the photoelectric transducer element 76. The element 76 detects the number of the slots 73b to 73f which have moved past it. Since the slots 73b to 73f correspond to the light emitting elements 78b to 78f of the indicator 78, a specified distance can be detected by collating the count output from the element 76 against the output signal from the light emitting elements 78b to 78f which appear in the indicator 78. In the meantime, the taking lens 4 also moves as the slots 78b to 78f are collated against the specified distance, and comes to a stop when it obtains a focal length which corresponds to the specified distance. (See a sequence block S46.) After a focal length of the taking lens 4 is established which corresponds to the specified distance, the subsequent operation jumps to the sequence block S25 of FIG. 6b, as indicated by a connector E. In the block S25, the motor 3 is stopped immediately as the specified distance is detected. In the transmission mechanism 10, the electromagnet 26 is turned on while the electromagnet 27 is turned off, applying a braking effort to the second connection shaft 32. Subsequently, the shutter controlling electromagnet 164 is turned off, as indicated by the sequence block S26, thus operating the shutter. The subsequent operation has been described above, and hence will not be described.

Figure 7:
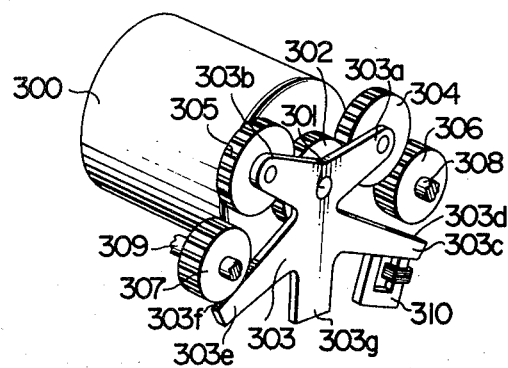
FIG. 7 is a perspective view showing a modification of the drive transmission mechanism of the motor driven camera.

FIG. 7 shows another embodiment of the motor drive transmission mechanism which may be utilized in the motor driven camera of the invention. Referring to FIG. 7 there is shown a reversible motor 300 having an output shaft 301 on which a sun gear 302 is integrally mounted. A gear support member 303 is rotatably mounted on the free end of the output shaft 301, and includes a first arm 303a which extends upwardly and to the right and on the free end of which is rotatably mounted a first planet gear 304 which meshes with the sun gear 302. The gear support member 303 includes a second arm 303b which extends upward and to the left and on the free end of which is rotatably mounted a second planet gear 305 which meshes with the sun gear 302.

A film winding and rewind drive gear 306 is disposed to the right and downwardly of the first planet gear 304 while a shutter charging driving gear 307 is disposed to the left and downwardly of the second planet gear 305. The gear support member 303 also includes a third arm 303c which extend to the right and the free end of which extends to a position adjacent to and below the drive gear 306. A brake shoe 303d is secured to the upper surface of the free end of the arm 303c. The gear support member 303 also includes a fourth arm 303e which extends downward and to the left and the free end of which extends to a position adjacent to and below the drive gear 307, with another brake shoe 303f secured to the upper surface of the free end of the arm 303e. A rewind controlling electromagnets 310 is disposed below the third arm 303c, and acts to attract the third arm when it is energized. The film winding and rewind drive gear 306 is fixedly mounted on a first connection shaft 308 while the shutter charging drive gear 307 is fixedly mounted on a second connection shaft 309. It will be noted that the gear support member 303 also includes a fifth arm 303g which extends vertically downward.

It is to be understood that the motor drive transmission mechanism shown in FIG. 7 includes components and parts which corresponds to those of the transmission mechanism 10 shown in FIG. 1 in a manner indicated in the table below, and operate in the same manner.

| Transmission mechanism of FIG. 7 | Transmission mechanism 10 of FIG. 1 |
| --- | --- |
| Motor 300 | Motor 3 |
| Sun gear 302 | Sun gear 11 |
| First planet gear 304 | First planet gear 13 |
| Second planet gear 305 | Second planet gear 14 |
| Film winding and rewind drive gear 306 | Film winding and rewind drive gear 15 |
| Shutter charging drive gear 307 | Shutter charging drive gear 18 |
| Gear support member 303 | Gear support member 12 and motor drive transmission switching member |
| First connection shaft 308 | First connection shaft 23 |
| Second connection shaft 309 | Second connection shaft 32 |
| First brake shoe 303d | First brake piece 22c |
| Second brake shoe 303f | Second brake piece 22d |
| Rewind controlling electromagnet 310 | Rewind controlling electromagnet 21 |

In FIG. 7, as the motor 300 and hence the sun gear 302 rotate clockwise, the first and second planet gears 304, 305 rotate clockwise about the sun gear 302 while revolving counter-clockwise. As a consequence, the first planet gear 304 meshes with the drive gear 306 to transmit the clockwise rotation of the motor 300 to the first connection shaft 308. On the other hand, the brake shoe 303f on the fourth arm 303e of the gear support member 303 bears against the peripheral surface of the drive gear 307, thus braking it against rotation.

When the motor 300 and hence the sun gear 302 rotate counter-clockwise, the first and second planet gears 304, 305 rotate counter-clockwise about the sun gear 302 while revolving clockwise. As a consequence, the second planet gear 305 meshes with the drive gear 307 to transmit the counter-clockwise rotation of the motor 300 to the second connection shaft 309. The brake shoe 303d on the third arm 303c of the gear support member bears against the peripheral surface of the drive gear 306, thus braking it against rotation.

In order to achieve a film rewind operation by transmitting the counter-clockwise rotation of the motor 300 to the first connection shaft 308, the rewind controlling electromagnet 310 is energized to hold the third arm 303c of the gear support member 303 attached thereto. The gear support member 303 then rotates clockwise about the output shaft 301, whereby the first planet gear 304 moves into meshing engagement with the film winding and rewind drive gear 306. At this time, the second brake shoe 303f bears against the peripheral surface of the drive gear 307. When the motor 300 rotates counter-clockwise subsequently, its rotation is transmitted to the first connection shaft 308 through the first planet gear 304, and drive gear 306, thus allowing the shaft 308 to rotate for performing film rewind operation.

It will be noted from the foregoing description that the motor drive transmission mechanism shown in FIG. 7 is similar in operation to the transmission mechanism 10 shown in FIG. 1 except that the gear support member 303 of FIG. 7 achieves the combined functions of the gear support member 12, as well as the first and second brake pieces 22c, 22d on the switching member 22 of FIG. 1.

What is claimed is:

1. A motor driven camera, comprising:
   a camera body;
   a film winding shaft disposed in said camera body;
   a film rewind shaft disposed in said camera body parallel to said film winding shaft;
   a single reversible drive motor disposed in said camera body, said motor having an output shaft;
   a first connection shaft disposed in a direction perpendicular to the direction of extension of said film winding shaft and said film rewind shaft; said first connection shaft having two ends;
   a motor drive transmission mechanism for transmitting drive from said motor to said first connection shaft;
   a film winding mechanism adjacent one said end of said first connection shaft for selectively transmitting drive from said first connection shaft to said film winding shaft; and
   a film rewind mechanism adjacent the other said end of said first connection shaft for selectively transmitting drive from said first connection shaft to said film rewind shaft.

2. A motor driven camera according to claim 1, wherein said first connection shaft is disposed parallel to said output shaft of said motor; and further comprising:
   a plurality of sub-assemblies housed in said body;
   a plurality of drive shafts for transmitting the drive of said motor to respective ones of said sub-assemblies;
   a second connection shaft parallel to said output shaft of said motor for transmitting drive from said motor drive transmission mechanism to selected ones of said drive shafts; and
   said motor drive transmission mechanism transmitting drive from said motor selectively to one of said first and said second connection shafts.

3. A motor driven camera according to claim 1 or claim 2, in which said film winding mechanism comprises:
   a film winding worm fixedly mounted on said first connection shaft;
   a sun gear disposed in meshing engagement with said worm, and having a sun gear shaft;
   a connection lever pivotally mounted on said sun gear shaft;
   a planet gear rotatably carried by one arm of said connection lever for meshingly engaging said sun gear;
   a film winding gear fixedly mounted on said film winding shaft and which is driven by means of said planet gear; and
   a spring urging said planet gear out of engagement with said film winding gear.

4. A motor driven camera according to claim 1 or claim 2, in which said film rewind mechanism comprises:
   a film rewind worm fixedly mounted on said first connection shaft;
   a sun gear disposed in meshing engagement with said worm, and having a sun gear shaft;
   a connection lever pivotally mounted on said sun gear shaft;
   a planet gear rotatably carried by one arm of said connection lever for meshingly engaging said sun gear;
   a film rewind gear fixedly mounted on said film rewind shaft and driven by means of said planet gear; and
   a spring urging said planet gear out of engagement with said film rewind gear.

5. A motor driven camera according to claim 2, in which said camera includes a shutter, and in which said subassemblies include a shutter charging assembly, an automatic focusing assembly, a zone focus assembly and lens driving assembly.

6. A motor driven camera according to claim 5, in which said motor drive transmission mechanism comprises:
   a sun gear secured to said output shaft of said motor;
   a gear support member mounted on said output shaft of said motor and rotatable relative thereto;
   first and second planet gears rotatably mounted on said gear support member and meshing with said sun gear;
   a film winding and rewind drive gear fixedly mounted on said first connection shaft, said film winding and rewind drive gear being for meshing with said first planet gear for being driven thereby when it is desired to drive one of said film winding shaft and said film rewinding shaft;
   a shutter charging drive gear fixedly mounted on said second connection shaft, said shutter charging drive gear being for meshing with said second planet gear for being driven thereby when it is desired to charge said shutter.

7. A motor driven camera according to claim 6, wherein said motor drive transmission member further comprises:
   an actuating pin secured to said gear support member;
   a first brake piece for applying a braking force to said first connection shaft and a second brake piece for applying a braking force to said second connection shaft;

a motor drive transmission switching member secured to said first and second brake pieces, said switching member being formed with a slot, and said actuating pin engaging said slot and supporting said switching member in such a manner that said switching member is rotatable about said actuating pin;

a drive pin secured to said switching member and extending parallel to said first and said second connection shafts;

an armature holding member secured to said drive pin;

a brake controlling armature secured to said armature holding member for selectively pulling said armature toward one of said connection shafts to cause an angular movement of said drive pin for selectively causing one of said brake pieces to apply a braking force to the corresponding one of said connection shafts;

a rewind controlling member for maintaining said first planet gear in meshing engagement with said film winding and rewind drive gear when it is desired to drive said film rewind shaft for rewinding; and resilient means urging said gear support member into a neutral position in which said first and second planet gears do not mesh with respective said drive gears on respective said connection shafts.

8. A motor driven camera according to claim 7, in which said resilient means comprises a pin fixedly mounted on said gear support member, and a torsion spring secured to said camera body, said torsion spring being formed of thin resilient wire material and having limbs which are resiliently urged toward each other by the resilience of said material, said pin on said gear support member being disposed between said limbs and at least one of said limbs urging said pin on said gear support member into said neutral position at all times.

9. A motor driven camera according to claim 5, in which said shutter charging assembly comprises:

a worm fixedly mounted on said second connection shaft;

a drive gear which meshes with said worm;

a drive shaft which is driven for rotation by said drive gear;

a shutter charging drive arm having one end secured to said drive shaft, and having a shutter charging pin fixedly secured to its other end;

a shutter charging member having a first elongate slot formed therein, said slot being engaged by said shutter charging pin, and said shutter charging member being driven in a sliding movement as said drive shaft rotates;

a shutter ring for charging said shutter responsive to said sliding movement of said shutter charging member, and having a detent step formed therein;

a detent lever for engaging said detent step to maintain said shutter ring in a predetermined position for maintaining said shutter in a charged condition; and a shutter controlling electromagnet for controlling the engagement and disengagement of said detent lever with said detent step.

10. A motor driven camera according to claim 5, in which said automatic focusing assembly comprises:

a worm fixedly mounted on said second connection shaft;

a drive gear which meshes with said worm;

a drive shaft which is driven for rotation by said drive gear;

a lens frame supporting said lens for moving said lens in a direction parallel to the optical axis of said lens;

a lens frame moving eccentric cam fixedly mounted on said drive shaft for moving said lens frame, thereby to move said lens;

a distance marker plate driving eccentric cam fixedly mounted on said drive shaft, and having a drive pin fixedly mounted thereon;

a movable mirror for being angularly driven by said drive pin to determine a distance to an object being photographed;

a fixed mirror for cooperating with said movable mirror to determine said distance;

a reflecting prism for receiving light from an object being photographed, after said light has been reflected by said movable mirror and said fixed mirror; said mirrors being disposed at respective locations which are symmetric relative to said prism;

a pair of condenser lenses for collecting light from an object being photographed, after said light has been reflected by said reflecting prism; and a photometric unit, including a pair of light acceptors each of which receives said light from said pair of condenser lenses and converts it into a respective corresponding photocurrent signal, said photometric unit comparing said photocurrent signals from said light acceptors for detecting a minimum difference therebetween, and further including means for storing the value of said minimum difference.

11. A motor driven camera according to claim 5, in which said zone focus assembly comprises:

a worm fixedly mounted on said second connection shaft;

a drive gear which meshes with said worm;

a drive shaft which is driven for rotation by said drive gear;

a lens frame supporting said lens, for moving said lens in a direction parallel to the optical axis of said lens;

a lens frame moving eccentric cam fixedly mounted on said drive shaft for moving said lens frame, thereby to move said lens;

a distance marker plate driving eccentric cam fixedly mounted on said drive shaft;

a distance marker plate having one end pivotally mounted, and being driven for angular movement about its said one end by means of said distance marker plate driving eccentric cam, and including a plurality of slots formed in its other end, said slots corresponding to selected distances;

a light emitting element and a photoelectric transducer element located at a position relative to said distance marker plate such that said light emitting element can cause an optical signal which it has generated to pass through a selected one of said slots formed in said distance marker plate and such that said photoelectric transducer element receives said optical signal;

means for establishing a specified distance to an object being photographed prior to a photographing operation; and a specified distance indicator for storing and recalling a signal indicative of said specified distance.

12. A motor driven camera according to claim 11, in which said means for establishing said specified distance comprises a pushbutton switch.

13. A motor driven camera according to claim 1, in which said motor drive transmission mechanism comprises:
- a sun gear fixedly mounted on said output shaft of said motor;
- a gear support member mounted on said output shaft of said motor and rotatable relative thereto;
- first and second planet gears rotatably mounted on said gear support member and meshing with said sun gear;
- a film winding and rewind drive gear fixedly mounted on said first connection shaft and adapted to engage said first planet gear for being driven by said first planet gear;
- a shutter charging drive gear fixedly mounted on said second connection shaft and adapted to mesh with said second planet gear for being driven by said second planet gear;
- a first brake shoe disposed on said gear support member for applying a braking force to said film winding and rewind drive gear as said gear support member rotates to bring said second planet gear into meshing engagement with said shutter charging drive gear;
- a second brake shoe disposed on said gear support member for applying a braking force to said shutter charging drive gear as said gear support member rotates to bring said first planet gear into meshing engagement with said film winding and rewind drive gear; and
- a rewind controlling member for maintaining said first planet gear in meshing engagement with said film winding and rewind drive gear on said first connection shaft when it is desired to drive said film rewind shaft for rewinding.

14. A motor driven camera according to claim 13, in which said brake shoes are integral with said gear support member.

* * * * *